US008830160B2

(12) United States Patent  (10) Patent No.: US 8,830,160 B2
Gila et al.  (45) Date of Patent: Sep. 9, 2014

(54) PRESENTING INFORMATION ON A CARD WITH A PASSIVE ELECTRONIC PAPER DISPLAY

(75) Inventors: Omer Gila, Cupertino, CA (US); Napoleon J. Leoni, San Jose, CA (US); Henryk Birecki, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 22 days.

(21) Appl. No.: 13/436,497

(22) Filed: Mar. 30, 2012

(65) Prior Publication Data

US 2012/0206341 A1  Aug. 16, 2012

Related U.S. Application Data

(63) Continuation-in-part of application No. 13/172,202, filed on Jun. 29, 2011, and a continuation-in-part of application No. 12/792,301, filed on Jun. 2, 2010.

(51) Int. Cl.
*G09G 3/34* (2006.01)
*B41J 3/407* (2006.01)
*G06K 19/077* (2006.01)

(52) U.S. Cl.
CPC ......... *B41J 3/4076* (2013.01); *G06K 19/07707* (2013.01)
USPC ...................................................... 345/107

(58) Field of Classification Search
USPC ............ 345/156, 179, 107; 178/19.01–19.04
See application file for complete search history.

(56) References Cited

U.S. PATENT DOCUMENTS

| | | | |
|---|---|---|---|
| 4,816,653 A * | 3/1989 | Anderl et al. ................. | 235/380 |
| 6,456,272 B1 | 9/2002 | Howard et al. | |
| 6,515,790 B2 * | 2/2003 | Miyamoto et al. ............ | 359/296 |
| 6,700,695 B2 | 3/2004 | Engler et al. | |
| 6,822,893 B2 | 11/2004 | Vincent et al. | |
| 7,265,894 B2 | 9/2007 | Schmitz | |
| 7,284,708 B2 * | 10/2007 | Martin .......................... | 235/492 |
| 7,463,400 B1 * | 12/2008 | Tatsuura et al. ............... | 359/273 |
| 7,499,211 B2 | 3/2009 | Suwabe et al. | |
| 7,975,927 B1 | 7/2011 | Whitney | |
| 8,144,388 B2 * | 3/2012 | Ogawa ......................... | 359/296 |
| 2005/0247797 A1 * | 11/2005 | Ramachandran ............. | 235/492 |
| 2006/0017659 A1 | 1/2006 | Ogawa et al. | |
| 2007/0176973 A1 | 8/2007 | Hisanobu | |
| 2008/0122219 A1 | 5/2008 | Dunnigan et al. | |
| 2008/0217412 A1 * | 9/2008 | Lane ............................. | 235/492 |
| 2008/0292978 A1 | 11/2008 | Lin et al. | |
| 2010/0060628 A1 | 3/2010 | Lenssen et al. | |
| 2010/0116894 A1 | 5/2010 | Modica | |
| 2011/0060640 A1 | 3/2011 | Thompson et al. | |
| 2011/0081527 A1 | 4/2011 | Yamato | |
| 2011/0101111 A1 | 5/2011 | Roncari et al. | |

FOREIGN PATENT DOCUMENTS

JP  7179060  7/1995
KR  20080064405  7/2008

* cited by examiner

*Primary Examiner* — Chanh Nguyen
*Assistant Examiner* — Ram Mistry (57) ABSTRACT

With a card including a passive electronic paper display configured to display a visual image, a method of presenting information on a card includes selectively changing a visual image displayed on the passive electronic paper display to update information represented by the visual image, and wherein the card is sized to be carried by a user.

22 Claims, 9 Drawing Sheets

PRESENTING INFORMATION ON A CARD WITH A PASSIVE ELECTRONIC PAPER DISPLAY

CROSS REFERENCE TO RELATED APPLICATIONS

The present application is a continuation-in-part and claims the priority under 35 U.S.C. §120 of prior U.S. patent application Ser. No. 12/792,301, entitled "Systems and Methods for Writing on and Using Electronic Paper," filed Jun. 2, 2010 and U.S. patent application Ser. No. 13/172,202, entitled "Electronic Paper with Porous Standoff Layer," filed Jun. 29, 2011. These applications are incorporated by reference in their respective entireties.

BACKGROUND

Data cards provide a way for entities to communicate information to a user of the card and to those to whom the user may present the car. Information on the card may be presented in a number of ways. For example, information may be printed on the card and read by the user visually. In another example, information may be stored on the card electronically, such as on a magnetic strip

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

As described above, the ability to present information on cards has numerous benefits. However, after a card is issued, the information thereon may become outdated, thus compromising the value of having the user continue to use that card. This may result in the issuer needing to regularly produce and issue new cards to communicate intended information to users and those to whom users may present their cards.

Additionally, once a card has been used for its designated purpose, the card is usually disposed of. This is wasteful as card issuers may then end up having to give multiple cards to a user over the course of time.

In certain circumstances, if a card has an associated monetary value that is periodically decreased by the user, the data card does not display to the user the current balance on the card. Thus, the user must remember or guess at what value remains on the card.

In light of these and other issues, the present specification discloses techniques for presenting information on a card with a passive electronic paper display. The passive electronic paper display can be selectively changed to represent updates in information for both the user of the card and those to whom the user may present the card.

As will be described in more detail below, the card may further include a standoff layer to limit the devices that may selectively change the electronic paper display. This provides some security for the information displayed on the card. The card may also include a storage device that contains data stored electronically.

In various examples described below, a method includes selectively changing a visual image on a passive electronic paper display of a card that is sized to be carried by a user. The information presented on the passive electronic paper display may be selectively changed using, for example, an ion beam emitter to control an electrical charge on the surface of the passive electronic paper display that changes the image presented.

A computer product is also disclosed that includes a tangible storage medium containing instructions for presenting information on a card according to a variety of applications. The tangible storage medium is connected to a processor that controls, for example, a charging device such as an ion beam emitter for changing the visual image presented on the passive electronic paper display of a card.

Using a passive electronic display on a card to communicate information provides a simple, efficient, and inexpensive way to update the information presented on the card. Because the display can be changed to display new information, the card of the present disclosure need not be discarded after an initial period of use. This promotes efficiency as new cards do not need to be printed each time the information on the card needs to be changed. Instead, the passive electronic paper display can be updated to reflect changes in the informational image on the card.

In one example of these principles disclosed herein, a passive electronic paper display is used on a card that has an associated monetary value that can be spent, such as a gift card or debit card. As the user makes purchases, the passive electronic paper display can be updated to present a visual indication of the remaining value of the card.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language suggests that a particular feature, structure, or characteristic described in connection with the example is included in at least that one example, but not necessarily in other examples. The various instances of the phrase "in one example" or similar phrases in various places in the specification are not necessarily all referring to the same example.

Figure 1A:
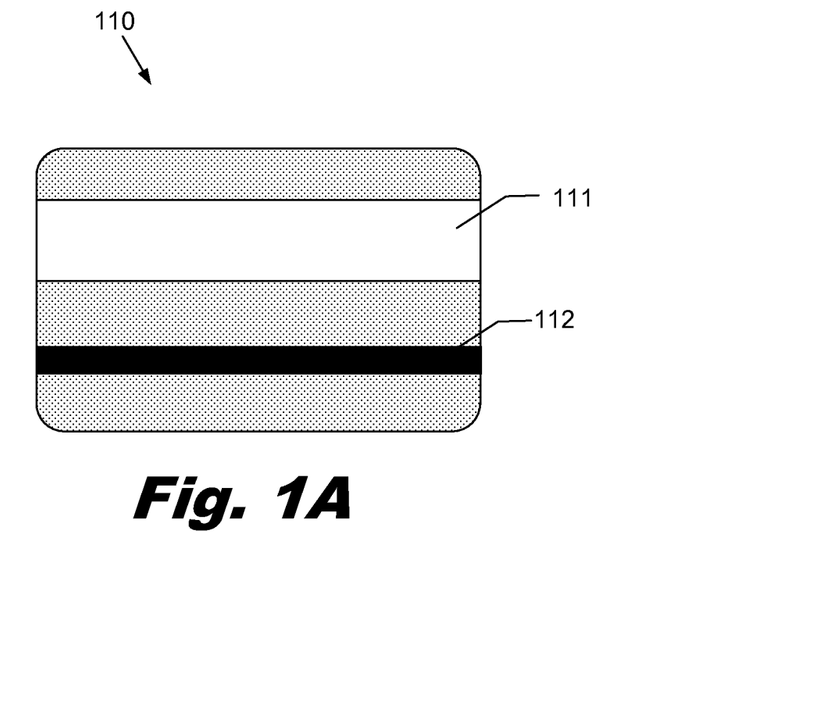
FIG. 1A is an illustration of one example of a card with a passive electronic paper display according to principles described herein.

FIG. 1A is an illustration of one example of a card with a passive electronic paper display according to principles described herein. As shown in FIG. 1A, the card (110) in this example is sized to be carried by a user. This may refer to the size of a standard credit card or the like. Although, the card (110) may be of any size that is convenient for the user to carry.

The card (110) includes a passive electronic paper display (111). An electronic paper display is designed to reflect light to render an image visible in the same manner as an image printed with ink on ordinary paper. As used herein and in the appended claims, a passive electronic paper display is not connected to any electrode, circuit or power supply. Thus, a passive electronic paper display is changed by an applied electrical field that is not generated by the display device itself. Additionally, the passive electronic paper display is capable of displaying text and images indefinitely without using electricity to refresh or maintain the image. Passive electronic paper displays can be implemented as a flexible, thin sheet, like paper.

The card (110) may also include a device for storing data electronically. In the example of FIG. 1A, this is a magnetic strip (112). However, other electronic data storage devices may be disposed on the card (110) including, but not limited to a microchip, radio frequency identification tag (RFID) tag and the like.

Figure 1B:
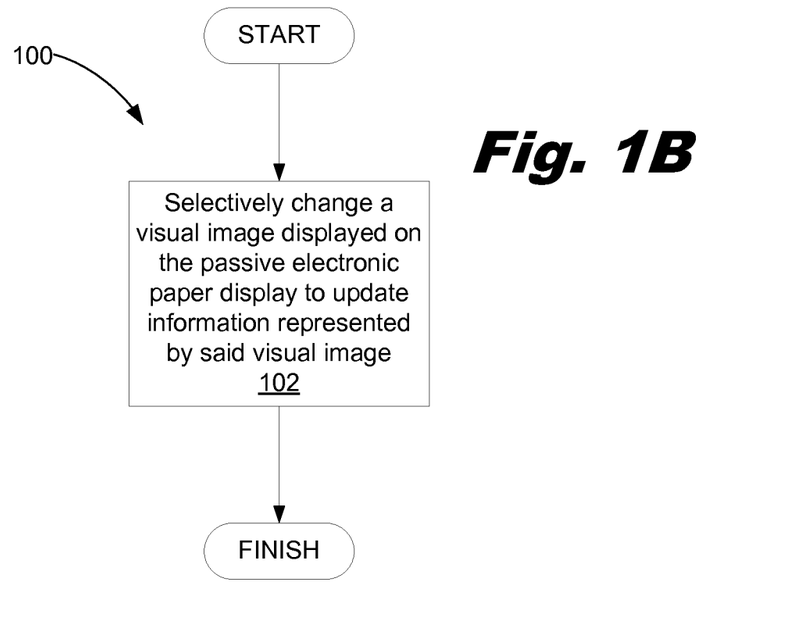
FIG. 1B is a flowchart showing a method for presenting information on a card, according to an example of principles described herein.

FIG. 1B is a flowchart showing a method (100) for presenting information on a card with a passive electronic paper display. As in the example of FIG. 1A, the card includes a passive electronic paper display (111) disposed on the card (110) that displays a visual image. Through this visual image, information may be presented to a user. This passive electronic paper display is not coupled to any electrodes, circuit or power supply. Therefore, it does not draw an electrical charge and can maintain a displayed image for extended durations of time.

The method (100) may begin by selectively changing (102) the visual image displayed on the passive electronic paper display to update information represented by the visual image. The visual image may be selectively changed by a number of devices that have or create an electric field. Examples of such charging devices, include, but are not limited to ion beam emitters, electrified styluses, electrodes, or corona discharge mechanisms. For example, as described in further detail below, an ion beam emitter may pass over the card emitting ions through a standoff layer to selective change the image displayed and update the information represented by the image.

By changing the visual image, the information presented on the passive electronic paper display may be updated. Changing of the visual image allows the issuer of the card to alter the information presented to a cardholder without issuing a new card, in a number of applications. For example, the monetary balance left on a gift card could be selectively changed as the user purchases items with the gift card. Additionally or alternatively, an issuer could load a coupon to the visual image on a card. Then, as the user redeems the coupon, or as the coupon expires or is otherwise invalidated, the issuer may grant another coupon that is written to the passive electronic paper display without issuing a different card. As indicated above, the card may be sized to be carried by a user, and the information on the card may be changed at a point-of-sale or other interaction point where an appropriate device can change the image on the passive electronic paper display of the card.

Figure 2A:
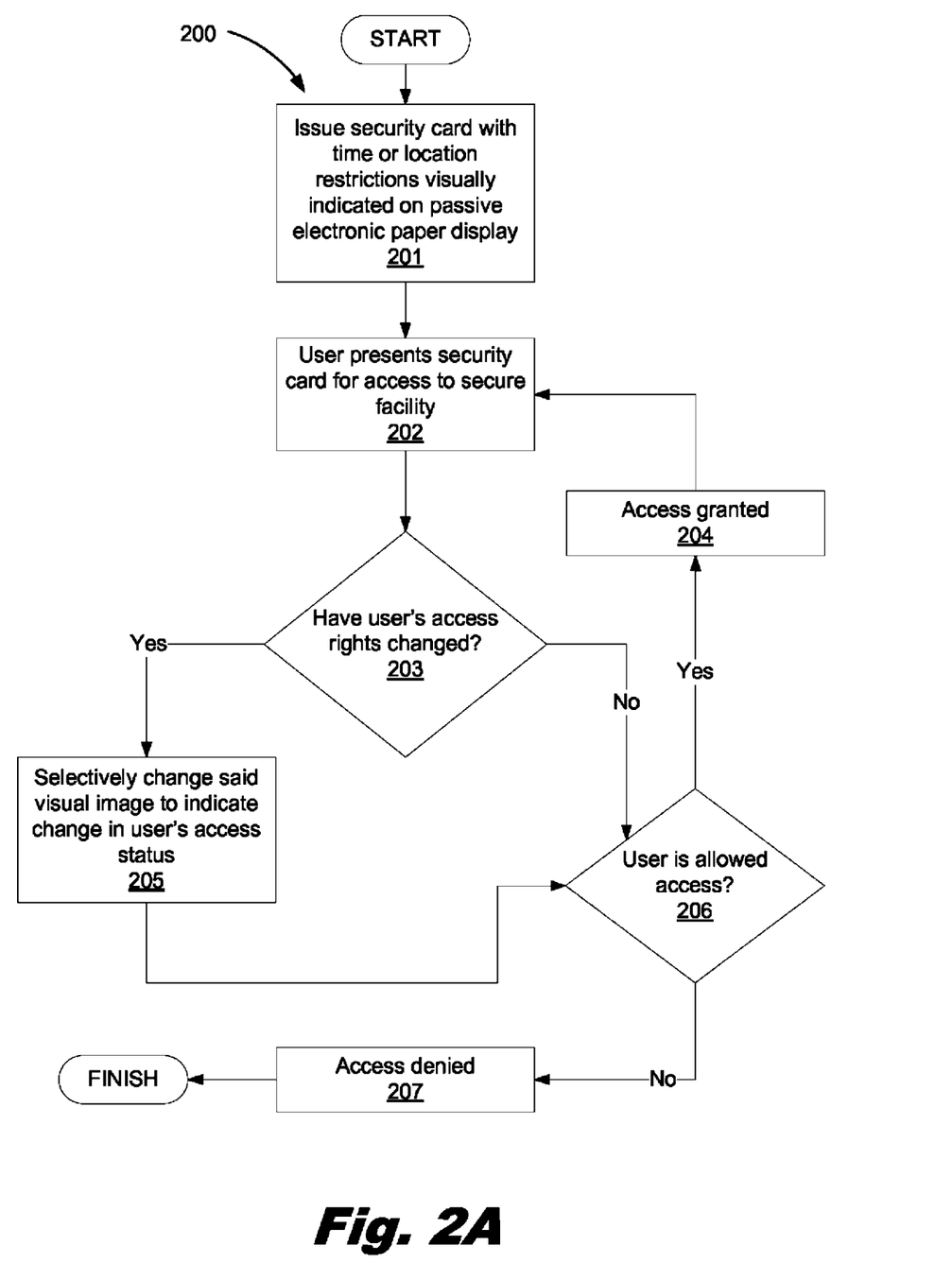
FIGS. 2A-2C are flowcharts showing methods for different possible applications of the principles described herein for presenting information on a card with a passive electronic paper display.

FIG. 2A is a flowchart showing a method (200) for presenting information on a card where the card is a security card. As shown in FIG. 2A, the method begins with the security card being issued (201) to a user who is authorized to use a facility on a limited basis. For example, the user may have a time restriction on use of the facility. In such an instance, the user has access to the facility for a limited period of time, such as 24 hours. Alternatively, the user may have location restrictions such that the user can only access certain locations within the facility and not others.

The term facility is used here broadly to refer to any secured area or resource to which access is granted on a selective basis. Thus, a facility may be, but is not limited to, a building, particular areas within a building, a specific room in a building, a computer or other electronic resource and others.

In any event, the restrictions on the user's use of the facility are visually indicated on the passive electronic paper display of the card. The restrictions may also be encoded electronically on the card, such as on a magnetic strip or some other memory device on the card. In some examples, a picture of the authorized user may also be displayed on the electronic paper display. In this way, both the user and others in the facility can be advised of what access rights the user of the card has been granted.

When the user desires to use the secured facility, the card is presented (202) to demonstrate the user's privilege to access the facility. In some examples, the card may be presented at an electronic security point that reads the electronic data on the card indicating the user's access restrictions. A human attendant may also be present and may view the indication of the user's access privileges displayed on the passive electronic paper display.

This security point may also include a device, examples of which are described below, for changing the visual image on the passive electronic paper display. The method (200) will next determine (203) if the user's access rights have changed. If so, the security point will change (205) the visual image on the passive electronic paper display of the card to indicate the change in the user's access status. For example, the passive electronic paper display may be changed to state that the user has no further access to the facility. Alternatively, some symbol may be shown in the passive electronic paper display that indicates to a trained attendant what access rights the user then has.

A determination (206) is then made as to whether the user is allowed access. This may be performed by the electronic security point, by a human security point attendant or both. The user is then granted access (204) or denied access (207) to the secured facility as appropriate. Because the access identifier shown on the passive electronic paper display may be readily changed, an issuer of the card may reuse a single security card to grant access on multiple occasions.

In a more specific example of the method illustrated in FIG. 2A, a company may issue security cards valid for 24 hours. An access identifier, for example a triangle shape, may be printed on the passive electronic paper display which grants access to the facility for that 24 hour period. After the 24 hour period, the access identifier may be changed, indicating that the user's access to the facility has expired. This may occur when the user presents the expired card to a reader that determines the user's access and also includes a device for changing the image on the passive electronic paper display.

Figure 2B:
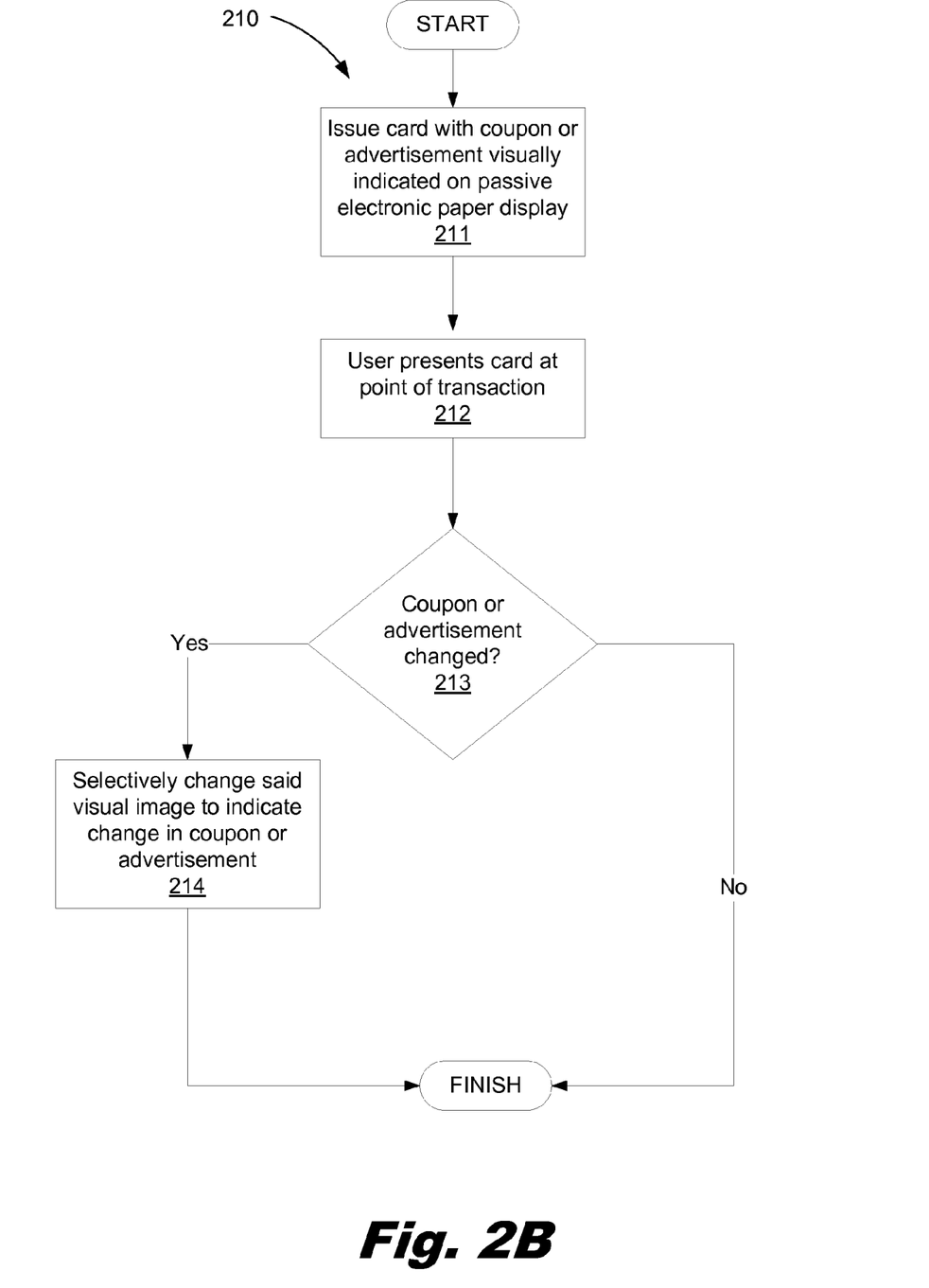

If the user is authorized for continued access, the visual image may then be changed to include a new access identifier, for example a circle shape, to grant access for a new 24 hour period. Selectively changing access identifiers increases the security afforded by reducing the risk of counterfeiting a security card as the proper access identifier may be constantly changing FIG. 2B is a flow chart illustrating another possible application (210) of the principles disclosed herein. As shown in FIG. 2B, the card with the passive electronic paper display may be issued (211) with a coupon or advertisement shown thereon. For example, the retailer may issue a 10% discount on selected merchandise or may offer a second item for free when a first is purchased.

If the user decides to act on the advertising or redeem the coupon, the user presents (212) the card at a point of sale or other point of transaction. This point of sale or transaction includes a device for changing the image visually displayed on the passive electronic paper display. If a coupon is displayed, the user can be given the value of the coupon in the purchase according to the terms of the coupon.

At this point, a determination (213) is made whether to offer a new coupon. This may be the case even if the previous coupon was not redeemed. Additionally or alternatively, it may be desired to change the advertising on the card, with or without a purchase having been made.

If it is determined (213) to change (214) the advertisement or coupon on the card, the point of transaction will change the visual image on the passive electronic paper display of the card to present a new coupon or new advertising. This method can then be repeated to continue the relationship between the card holder and issuer of the coupons or advertising.

In the coupon example, this alteration of the coupon shown allows an issuer to provide a series of subsequent coupons on a single card, rather than printing new cards for each distinct coupon at some unwarranted expense. In other examples, as indicated, advertising is presented. Such advertising includes, but is not limited to, general advertising of the issuer of the card, information relating to a featured product, announcement of special events, and images. The advertising information may relate to the issuer of the card, or to another entity. Displaying the advertising information on the passive electronic display allows an issuer to alter its advertising scheme as desired, without having to reprint new cards. Such updating offers an issuer a simple, cost-effective way to keep users apprised of new information.

Figure 2C:
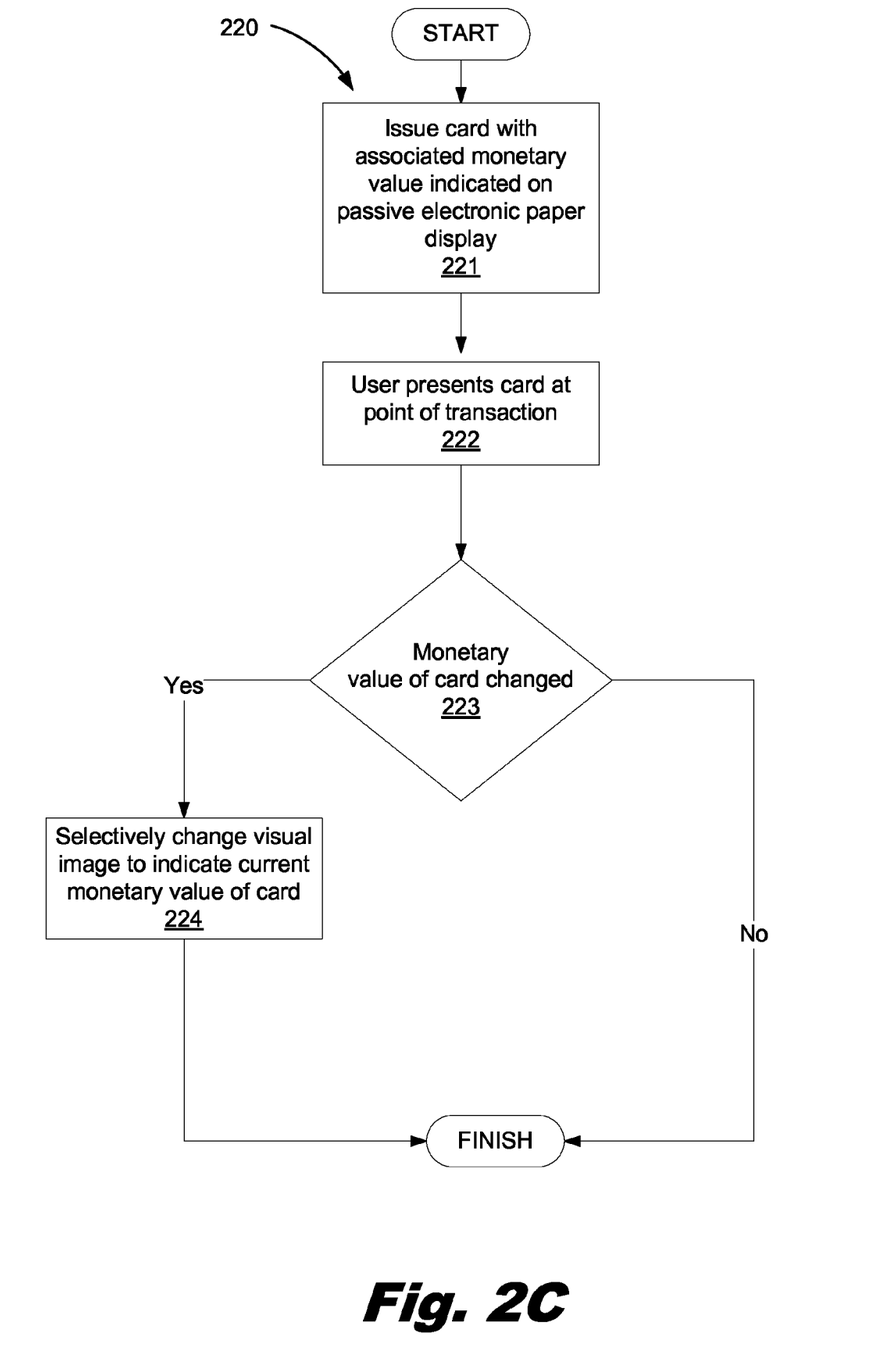

FIG. 2C is a flow chart illustrating a third possible application (220) of the principles disclosed herein. As shown in the Figure, the card is issued (221) with an associated monetary value. That value may be recorded electronically on the card, for example, in a magnetic strip or other memory device. The value may also be visually indicated on the passive electronic paper display.

The user then presents (222) the card at a point of sale or transaction. This point of sale or transaction will include a device for changing the visual image on the passive electronic paper display of the card, as described in detail below.

If the user engages in a transaction that changes the value of the card (223), the point of transaction will change (224) the visual image on the passive electronic display to report the new value of the card. For example, the user may purchase an item thus decreasing the value of the card, which lowered value is then displayed on the card itself. In another example, the user may purchase value for the card, and the point of transaction will change the visual image on the card to reflect the increase in value.

Figure 3A:
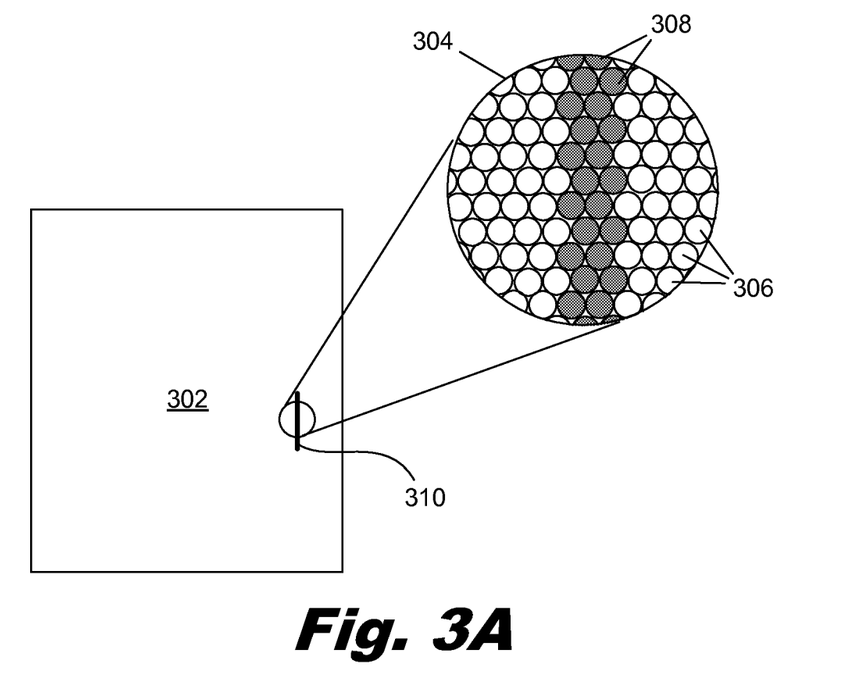
FIGS. 3A-3C are various views of a passive electronic paper display, according to an example of principles described herein.

Details of one example of the passive electronic paper display described herein will now be given. FIG. 3A is a top view of a portion of a passive electronic paper display (302) and includes an enlargement (304) of a small portion of the display. The passive electronic paper display (302) is not coupled to electrodes, a circuit or a power supply. Thus, the passive display (302) does not draw an electrical charge to maintain the display and can display an image for an extended period of time without consuming electrical power.

The enlargement (304) shows that, according to one example, the electronic paper display (302) may include an array of embedded, spherical-shaped microcapsules (306, 308). According to an example, charged pigment particles may be placed within the microcapsules to create an image. In this example, an electrical field is generated across the microcapsules to create the desired image by moving the charged pigment particles within them. The microcapsules (306, 308) are designed to exhibit image stability using chemical adhesion between particles and/or between the particles and the microcapsule surface. For example, the black and white microcapsules (306, 308) may be designed to hold text and images for a relatively long time (e.g., hours, days, or even indefinitely) without actively maintaining an electric field, in contrast to other conventional display systems (e.g., a TFT display).

For example, a line (310) in the passive display (302) is created by selectively applying an electrical field to the passive display (302). The electrical field moves the charged pigment particles within the microcapsules (306, 308). In this example, a charge has been applied that moved dark pigment particles to the front of the microcapsules (308) to form the line (310). According to one example, a charging device applies the electrical charge to the microcapsules. Examples of charging devices include, but are not limited to, ion beam emitters, electrode systems, electrified styluses, and corona discharge mechanisms.

Figure 3B:
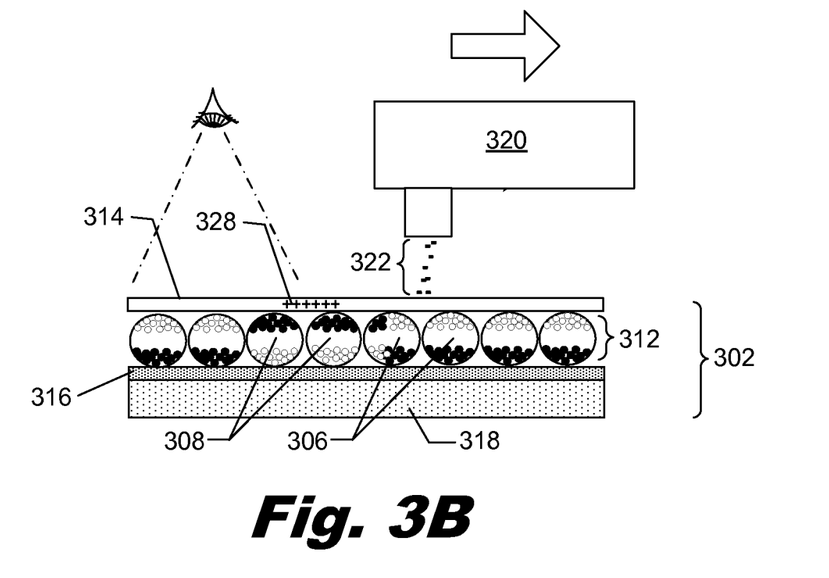

FIG. 3B is a cross-sectional view of a portion of the passive electronic paper display (302) shown in FIG. 3A. The cross-sectional view shows a multilayer structure of the passive electronic paper display (302), including a pigment layer (312) with microcapsules (306, 308) sandwiched between a transparent charge receiving layer (314) and a conductive ground layer (316). The transparent charge receiving layer (314) may serve as a wear protection layer for the pigment layer (312) and normalizes the passive electronic paper display (302) surface, eliminating surface topography and blocking surface conduction paths on the microcapsule surfaces. The transparent charge receiving layer (314) may be comprised of a transparent polymer and can range in thickness. In one example, the conductive ground layer (316) may be comprised of a transparent conductive material, such as indium tin oxide. In another example, the conductive ground layer (316) may be comprised of an opaque conductive material. According to one example, the conductive ground layer (316) may be disposed on a substrate (318). The substrate (318) may be comprised of polyester, plastic, or transparent Mylar.

As described above, according to one example the microcapsules (306, 308) may be filled with colored pigment. In this example, the image may be electrically written on the surface using a number of different charging devices (320) placed in proximity to the passive display. The charging device (320) may be moved along the surface of the passive display depositing a number of positive electrical charges (322) along the surface of the charge receiving layer. As a result, the negatively charged black pigment particles within the microcapsules (308) are drawn to the surface creating a darkened portion of the passive electronic paper display (302).

Figure 3C:
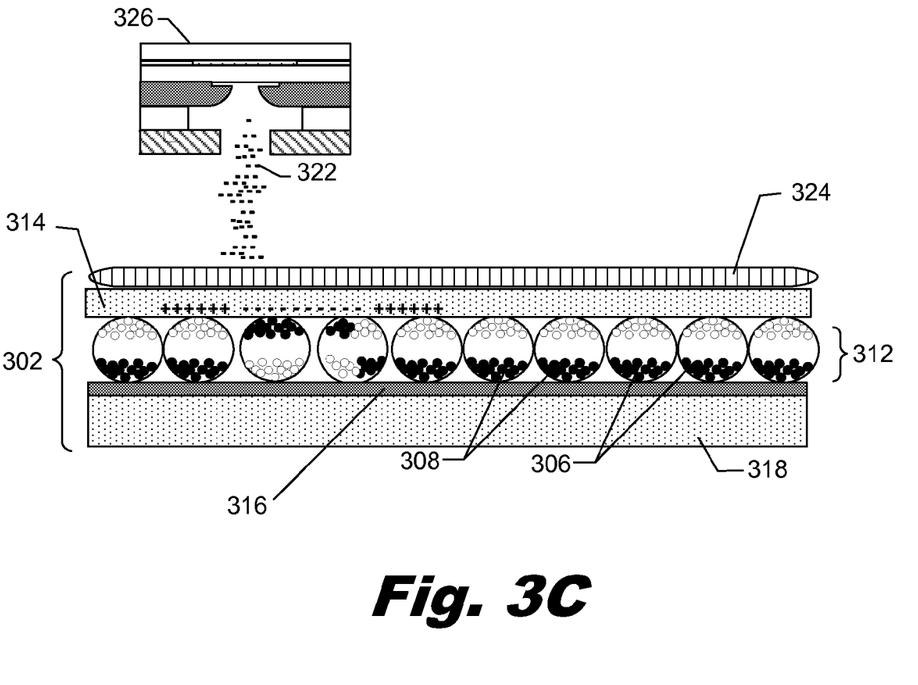

FIG. 3C is a cross-sectional view of a passive electronic paper display (302). According to an example, the visual image may be selectively changed using an ion beam emitter (326) to update the information presented on the visual image. An ion beam emitter (326) alters the visual display by selectively ejecting ions (322) towards the charge receiving layer (314). As the ions (322) reach the charge receiving layer (314), they remain on the surface to create positively charged areas (328). The positively charged white particles are repelled and driven away from the positively charged areas (328), while the negatively charged black particles are attracted to the positively charged areas (328). The ions (322) expelled from the ion beam emitter (326) are kept focused over a long distance with a relatively small field.

According to an example, the passive display (302) may also include a standoff layer (324) disposed on the transparent charge receiving layer (314) that imposes an electrical distance between the transparent charge receiving layer and the charging device, while being permeable to free ions. This standoff layer (324) prevents easy alteration of the passive display (302) from common charging devices such as an electrically charged stylus or an electrode, while permitting other charging devices, such as an ion beam emitter, to alter the display.

In one example, the standoff layer is formed from material that is porous at appropriate length scales, for example screen meshes. A screen mesh that is porous at the appropriate length scale would permit ions from an ion beam emitter to permeate and selectively change the displayed image.

However, the spacing provided by the standoff layer would require another writing device, such as a charged stylus, to use a larger electrical field to change the displayed image. This larger electrical field will tend to also make unintended changes to adjacent portions of the display as well as the portion which the stylus user intends to change. In this way, it will be very difficult to make unauthorized changes to the displayed image that are not immediately apparent as being unauthorized. Thus, using the standoff layer (324) in this fashion increases the security of the information presented in the visual image as it restricts alteration of the image to certain charging devices.

The standoff layer could be formed from a variety of materials. For example, the standoff layer could be formed from a hydrophobic material or have a hydrophobic coating. This would protect the exposed surface of the standoff layer from accumulating a potentially harmful layer of a liquid electrolyte such as sweat or atmospheric moisture.

Figure 4A:
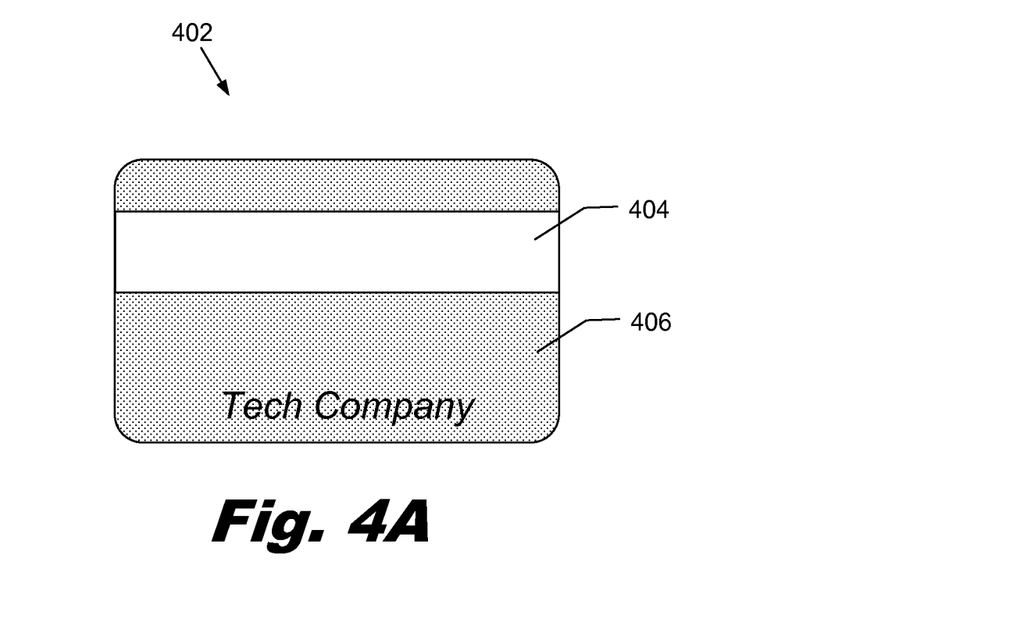
FIGS. 4A-4D are various examples of cards configured to display a visual image, according to one example of principles described herein.

FIGS. 4A-4D are various examples of cards configured to display a visual image according to principles described herein. FIG. 4A depicts a card (402) which includes a passive electronic paper display (404). As described herein, the passive electronic display (404) is configured to display a visual image that can be selectively changed. This visual image may be printed on the passive display (404) using a black and white configuration or a color configuration.

According to one example, the card (402) may also include a permanent portion (406) that presents information to the user. Information included on the permanent portion includes, but is not limited to, identification information of the card issuer, advertising information, instructions on use of the card, and use conditions.

Figure 4B:
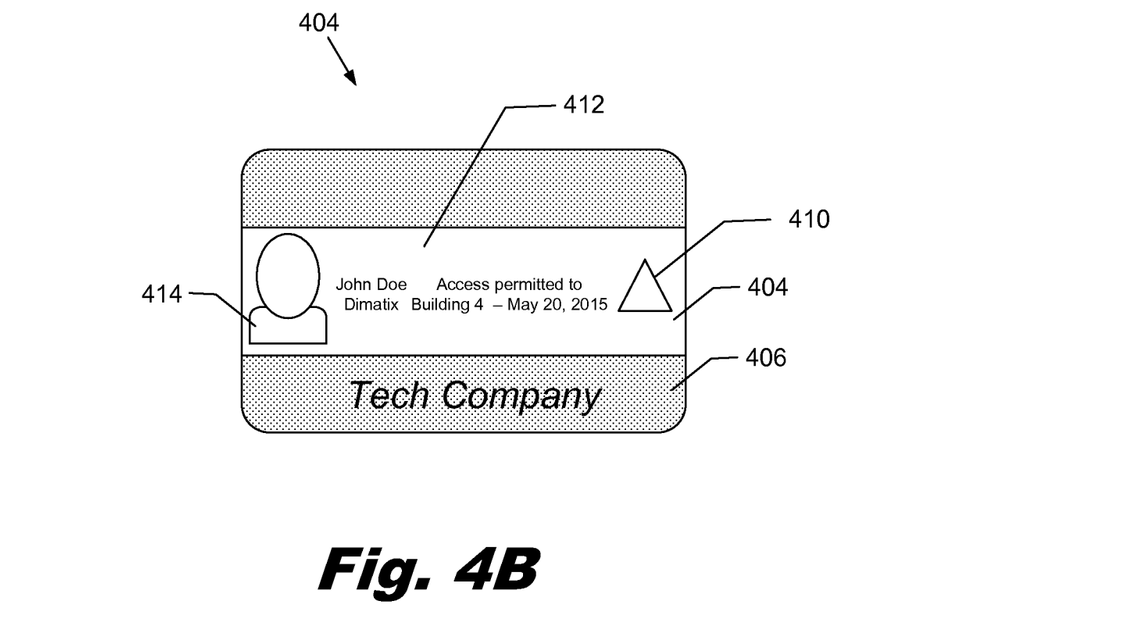

FIG. 4B depicts a security card (408) that displays information relating to restrictions imposed on the user of the card. As described above, the security card (404) may impose any number of access or time restrictions on the user of the card. These restrictions may be printed on the passive electronic paper display (404) of the security card (408). According to one example, the passive display (404) of the security card (408) includes an access identifier (410) that indicates the security restrictions imposed on the user of the card. For example, a user may have access to certain buildings of a facility, and not have access to other buildings of the facility. In this example, the access identifier (410) of the passive display (404) may be printed to reflect these restrictions. In these examples, the access identifier (410) indicates the various access restrictions such that the user of the security card (408) and others can visually identify the access limitations.

According to another example, the access identifier (410) may interact with a mechanism to permit or restrict access according to the restrictions imposed on the user. For instance, a reader located at the entrance of a room may interact with the security card to allow or restrict access conforming with the restrictions tied to the access identifier (410).

As described above, printing the access identifier (410) on the passive display (404) allows the access identifier to be periodically altered to increase security by altering the image to reflect changes in access restrictions. For example, a security card (408) may grant access to a facility for a given time period, i.e. 24 hours. An access identifier (410) corresponding to this 24-hour period may be printed on the passive display (404). After the 24-hour period has expired a new access identifier (410) may be printed such that any previous access identifiers no longer grant access.

The access identifier (410) may include any number of identifying elements. These elements include, but are not limited to, shape, color, words, symbols, numbers, letters, or combinations thereof. For simplicity sake the access identifier (410) in FIG. 4B is a triangle shape.

The passive display (404) of the security card (408) may also include identification information (412) pertaining to the user of the card. Such identification information may include, but is not limited to the cardholder's name, reprehensive organization, and access restrictions. In one example, the identification information may include a photograph (414) or other graphical representation of the user of the card. As described above, the identification information (412) and photograph 414) may be selectively changed to reflect changes in access restrictions.

Figure 4C:
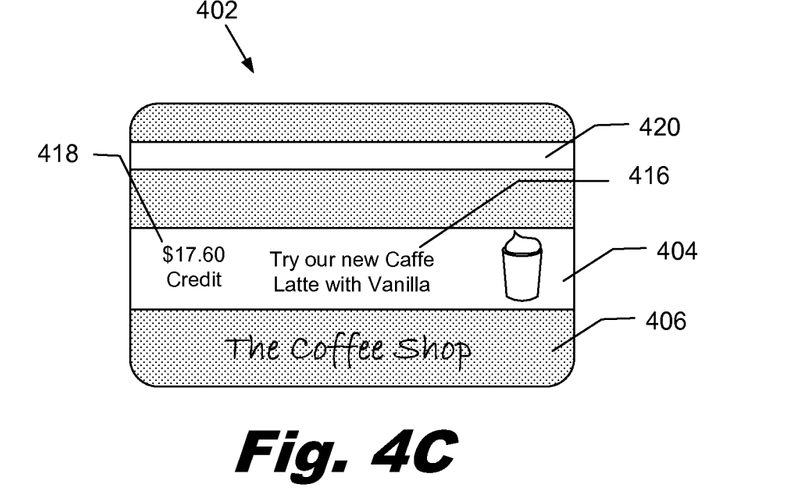

FIG. 4C depicts a card (402) with a passive electronic paper display (404) and a permanent portion (406). According to one example, the passive display presents advertising (416) to the user of the card. Examples of such advertising (416) include but is not limited to, advertising relating generally to the issuer of the card, information relating to a featured product, announcement of special events, images, etc. Displaying the advertising (416) on the passive display allows an issuer to alter its advertising scheme as desired.

According to one example, the passive display (404) of the card (402) may also present a current amount of a monetary balance of the card (418). For example, a retailer may load a monetary balance onto the card. Initially, this value may be displayed on the passive display (404). As the user purchase items from the retailer, the monetary balance as depicted on the passive display (404) may be updated to represent the transactions.

The card (402) may also include a storage device (420) that holds information relating to the monetary balance (418) of the card. Examples of such storage devices include, but are not limited to, magnetic bands, and embedded radio frequency circuitry. For simplicity sake, FIG. 4C depicts a magnetic band storage device (420). While FIG. 4C depicts the storage device (420) on the same side of the card as the passive display, the storage device may be located on the opposite side of the card.

The storage device (420) may interact with a corresponding device to update the amount stored on the card (402). For example, as a user makes purchases, a retailer may swipe the card through a magnetic card reader. The magnetic card reader may interact with the magnetic band to alter the amount stored on the card. A charging device, such as an ion beam emitter, may then change the passive display (404) to reflect the current amount.

Figure 4D:
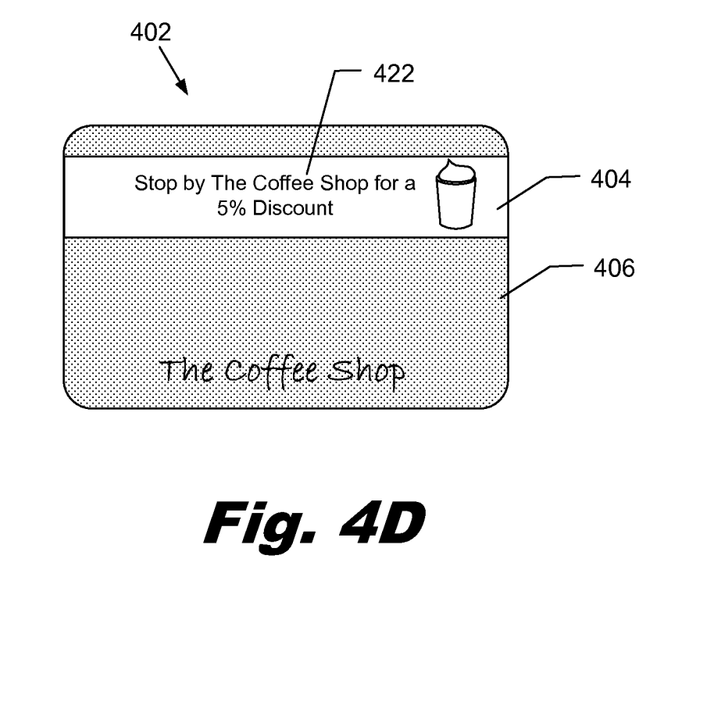

FIG. 4D depicts a card (402) with a passive electronic paper display (404) and a permanent portion (406). According to an example, the passive display (404) may present a coupon (422) to the user that may be redeemed upon presentation of the card to a corresponding issuer. In this example, the issuer of the coupon (422) may alter the displayed coupon to reflect different promotional items. For example, once a particular coupon (422) from a retailer is used, the retailer may then print a new coupon to the passive display (404).

Figure 5:
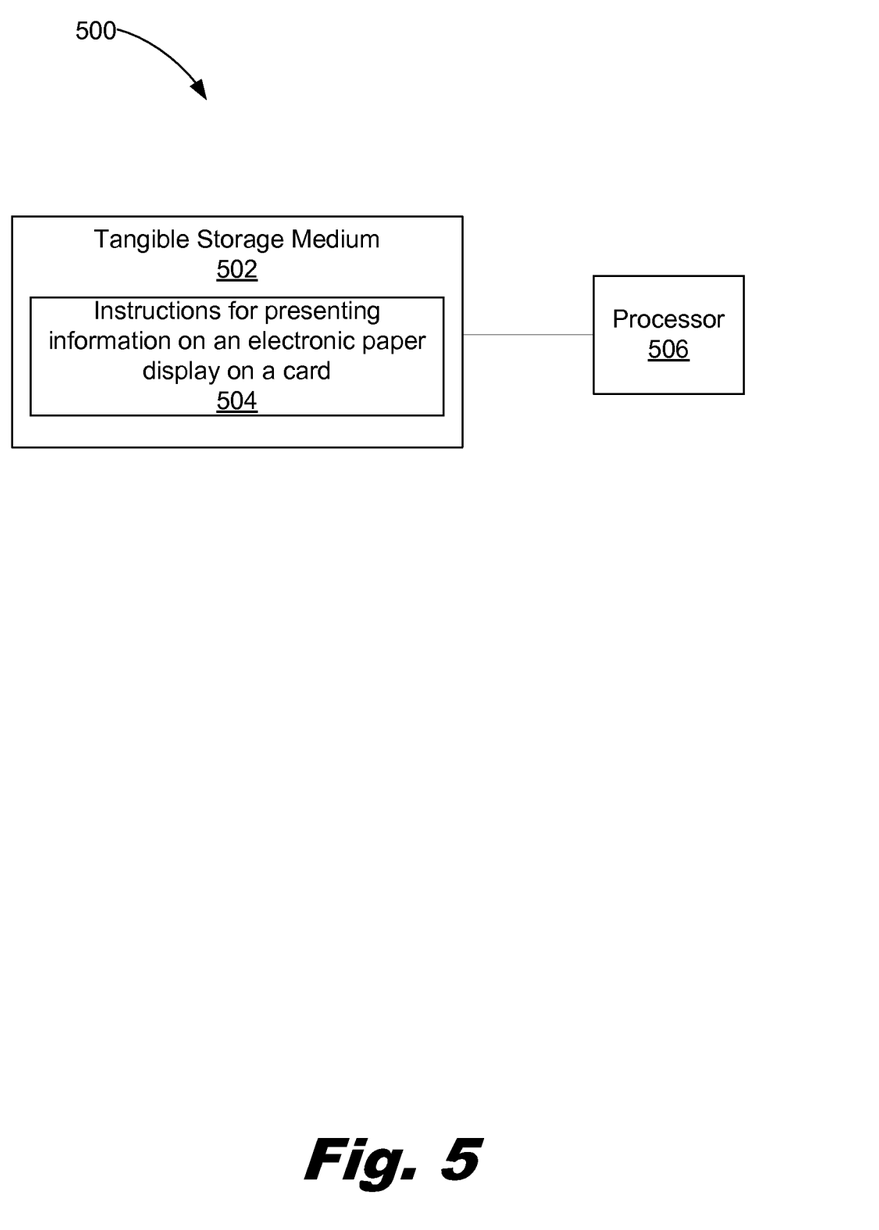
FIG. 5 is a diagram of a computer software product, according to one example of principles described herein.

FIG. 5 is a diagram of a computer software product (500) for presenting information on a passive electronic paper display. According to one example, the computer software product (500) may include a tangible storage medium (502). The tangible storage medium (502) may include instructions (504) for presenting information to the visual display of the passive electronic display. The computer software product (500) may also include a processor (506) communicatively connected to the tangible storage medium (502). The processor (506) being configured to read the instructions (504) stored on the tangible storage medium (502) and execute the prescribed function.

The instructions (504) as executed by the processor (506) may direct the processor to selectively change the visual image displayed on the passive display. According to one example, the instructions direct the processor to change the visual image by controlling a charging device, which charging device selectively changes the visual image of the passive display. Such selective changing of the visual image allows an issuer of the card to update the information represented by the visual image.

According to an example, the instructions (504) direct the processor to update the access restrictions or time restrictions imposed on a user, which restrictions are printed on the passive display of a security card. The instructions (504) may also direct the processor (506) to update the advertising on the passive display of a card. The instructions (504) may also direct the processor (506) to update the monetary value displayed on the passive display of a card. In these examples, the instructions (504) may direct the processor (506) to update the passive display by controlling a charging device.

The preceding description has presented techniques for presenting information on a card. A method includes selectively changing a visual image on a passive electronic paper display of a card that is sized to be carried by a user. As data cards are used with increasing frequency to communicate information, the current description includes techniques for simplifying the sharing of information presented on the cards. Using a passive electronic paper display allows for the periodic updating of the information presented on the card. The information to be shared may include access restrictions on a security card, advertising of a retailer, coupon distribution, and the balance of a gift card. The present disclosure allows an issuer of the card to keep the information on the card up to date. In this fashion a single card can be used to communicate various messages, rather than using a different card with each message to be shared.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of presenting information on a card, the card comprising a passive electronic paper display configured to display a visual image, said method comprising:

selectively changing a visual image displayed on the passive electronic paper display through a standoff layer disposed on the passive electronic paper display by operating an ion beam emitter to update information represented by said visual image, and inhibiting changing of said visual image by an electrically charged stylus via the standoff layer, wherein the card is sized to be carried by a user.

2. The method of claim 1, wherein said card is a security card that displays at least one of an access restriction or a time restriction imposed on said user.

3. The method of claim 1, further comprising selectively changing said visual image for presenting a coupon on said electronic paper display of said card.

4. The method of claim 1, further comprising selectively changing said visual image for presenting advertising on said electronic paper display of said card.

5. The method of claim 1, wherein said card is associated with a variable monetary value, said method further comprising selectively changing said visual image for displaying a current amount of said monetary value on said electronic paper display of said card.

6. The method of claim 1, wherein the standoff layer is a porous standoff layer.

7. The method of claim 6, wherein the standoff layer imposes an electrical distance to the passive electronic paper display.

8. A card comprising:

a passive electronic paper display configured to display a visual image that can be selectively changed to update information represented by said visual image; and a porous standoff layer disposed on top of said passive electronic paper display imposing an electrical distance to said passive electronic paper display permitting said visual image to be changed with an ion beam and inhibiting said visual image from being changed using an electrically charged stylus, wherein said card is sized to be carried by a user, and wherein said passive electronic paper display maintains a display of the visual image independent of an electrode.

9. The card of claim 8, wherein said card is a security card and said information includes at least one of an access restriction or a time restriction imposed on said user displayed on said passive electronic paper display.

10. The card of claim 8, wherein said electronic paper display presents advertising.

11. The card of claim 8, wherein said card is a coupon card and said electronic paper display presents a coupon that can be redeemed upon presentation of said card to a corresponding vendor.

12. The card of claim 8, wherein said card is associated with a variable monetary value, said electronic paper display showing a current amount of said monetary value of said card.

13. The card of claim 12, wherein said card further includes a storage device, the storage device storing said current amount of said monetary value of said card.

14. The card of claim 13, wherein said storage device includes a magnetic band storing the current amount of said monetary value of said card.

15. The card of claim 8, further comprising a charge receiving layer to normalize said passive electronic paper display surface.

16. The card of claim 8, in which the standoff layer comprises a hydrophobic material, a hydrophobic coating, or combinations thereof.

17. A non-transitory storage medium readable by a processor, the medium having stored thereon instructions for presenting information on an electronic paper display on a card, the instructions comprising:
a set of instructions that, when executed by a processor, causes the processor to control a charging device to selectively change a visual image displayed on the electronic paper using an ion beam emitter to update information represented by said visual image, in which the electronic paper comprises a screen mesh disposed on top of the electronic paper to inhibit a change of said visual image using an electrically charged stylus.

18. The medium of claim 17, wherein
the card is a security card and the electronic paper displays at least one of an access restriction or a time restriction imposed on said user, and
the set of instructions includes instructions than, when executed by the processor, causes the processor to control the charging device for updating at least one of the access restriction or the time restriction.

19. The medium of claim 17, wherein the set of instructions includes instructions than, when executed by the processor, causes the processor to control the charging device for updating advertising on said electronic paper display by selectively changing said visual image.

20. The medium of claim 17, wherein
the card is a pre-paid card associated with a variable monetary value, the electronic paper being to display at least a current amount of said monetary value,
the set of instructions includes instructions than, when executed by the processor, causes the processor to control the charging device for updating the current amount of said monetary value displayed by the electronic paper.

21. The medium of claim 17, wherein the screen mesh is a standoff layer imposing an electrical distance to the electronic paper.

22. The medium of claim 21, wherein the screen mesh is a porous layer.

* * * * *